(12) United States Patent (10) Patent No.: US 9,283,467 B1
Moore et al. (45) Date of Patent: Mar. 15, 2016

(54) METHOD AND APPARATUS FOR AUTOMATED COLLECTION AND SHARING OF SPORTING EVENT INFORMATION

(71) Applicant: Scorezone LLC, Greenville, IL (US)

(72) Inventors: Scott S. Moore, Edwardsville, IL (US); Gary Wayne Robert, Carlyle, IL (US); William Henson Purcell, IV, Glen Carbon, IL (US); David Lee Paslay, Moro, IL (US)

(73) Assignee: Scorezone, LLC, Greenville, IL (US)

( * ) Notice: Subject to any disclaimer, the term of this patent is extended or adjusted under 35 U.S.C. 154(b) by 377 days.

(21) Appl. No.: 13/722,574

(22) Filed: Dec. 20, 2012

(51) Int. Cl.
*A63B 69/00* (2006.01)
*A63B 71/06* (2006.01)

(52) U.S. Cl.
CPC ...................................... *A63B 71/06* (2013.01)

(58) Field of Classification Search
CPC ........... A63B 71/0616; A63B 71/0619; A63B 71/06699
USPC .............................. 340/539.1, 539.11, 323 R
See application file for complete search history.

(56) References Cited

U.S. PATENT DOCUMENTS

| | | | |
|---|---|---|---|
| 7,263,378 B2 | 8/2007 | Inselberg | |
| 7,483,891 B2 | 1/2009 | Liu et al. | |
| 7,596,759 B2 | 9/2009 | Verna | |
| 7,620,466 B2 | 11/2009 | Neale et al. | |
| 7,646,914 B2 | 1/2010 | Clausi et al. | |
| 7,660,856 B2 | 2/2010 | O'Brien et al. | |
| 7,679,487 B1* | 3/2010 | Smith et al. ............... | 340/323 R |
| 7,792,539 B2 | 9/2010 | Inselberg | |
| 7,797,005 B2 | 9/2010 | Inselberg | |
| 7,826,877 B2 | 11/2010 | Ortiz et al. | |
| 8,066,572 B1 | 11/2011 | Timmons et al. | |
| 2002/0044045 A1 | 4/2002 | Crookham et al. | |
| 2004/0210621 A1 | 10/2004 | Antonellis | |
| 2005/0138106 A1 | 6/2005 | Crookham et al. | |
| 2005/0138142 A1 | 6/2005 | Crookham et al. | |
| 2006/0025164 A1 | 2/2006 | Wang et al. | |
| 2007/0214227 A1 | 9/2007 | Quinn | |
| 2007/0233569 A1 | 10/2007 | Kelley et al. | |
| 2008/0005231 A1 | 1/2008 | Kelley et al. | |
| 2008/0010343 A1 | 1/2008 | Escaffi et al. | |
| 2009/0054123 A1 | 2/2009 | Mityagin et al. | |
| 2010/0063607 A1 | 3/2010 | Neale et al. | |
| 2010/0268768 A1 | 10/2010 | Kurtenbach et al. | |
| 2011/0208822 A1 | 8/2011 | Rathod | |

(Continued)

OTHER PUBLICATIONS

"Startup aims to let fans become part of the gameday experience online", downloaded from http://www.scorevine.com/blog/category/press-releases/ on Sep. 22, 2011, 1 page.

(Continued)

*Primary Examiner* — Daryl Pope
(74) *Attorney, Agent, or Firm* — Thompson Coburn LLP

(57) ABSTRACT

Techniques are disclosed for automating how information about sporting events is captured, processed, and stored for delivery to interested users. In an exemplary embodiment, score data for a sporting event is captured at a score source and communicated to a remote destination over a network as a URL request where score data is included in a portion of the URL following a domain name portion. In another exemplary embodiment, a scoreboard identifier and sporting event schedule data is used to determine how to translate received score data prior to loading in a database.

52 Claims, 6 Drawing Sheets

(56) References Cited

U.S. PATENT DOCUMENTS

2011/0258556 A1    10/2011   Kiciman et al.
2012/0066063 A1     3/2012   Quinn

OTHER PUBLICATIONS

"Sports Illustrated Invests in TAKKLE, Leading High School Sports Social Network", Business Wire, Jul. 23, 2007, pp. 1-3.

"The Next Generation of Social Networking has Arrived: Nextsportstar.com", PR Newswire, Jul. 5, 2011, Toronto, pp. 1-2.

"Gannett to launch more than 100 HighSchoolSports.net microsites across it network of local media web sites", Aug. 18, 2010, pp. 1, McLean, VA.

"Scorevine—Live Scoring & Fundraising Software for High School Spoils", Internet Archive Wayback Machine dated Jul. 2010, downloaded Sep. 22, 2011, 3 pages.

\* cited by examiner

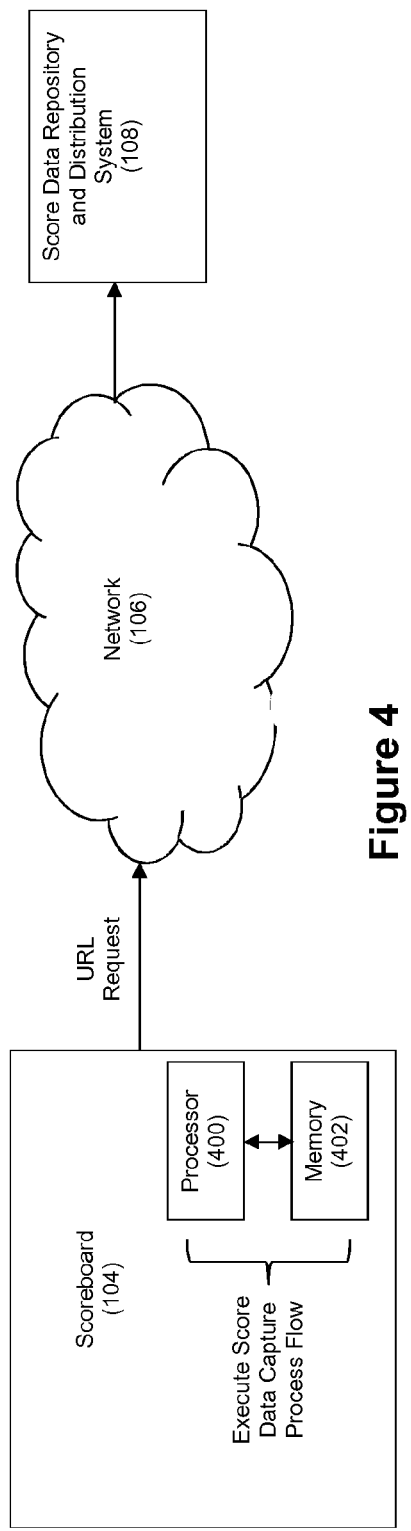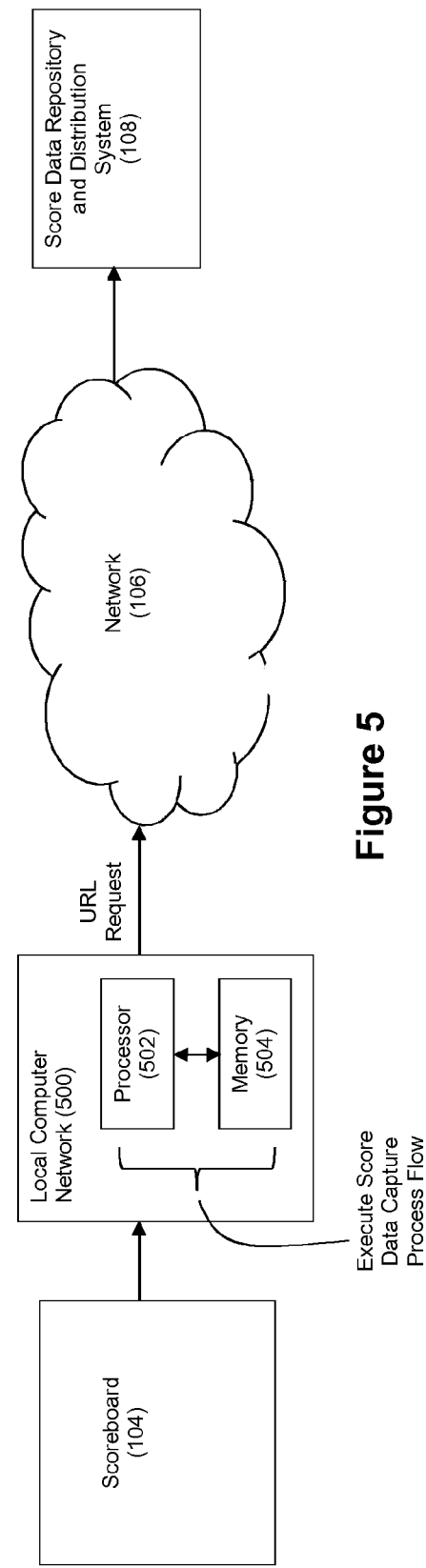

METHOD AND APPARATUS FOR AUTOMATED COLLECTION AND SHARING OF SPORTING EVENT INFORMATION

INTRODUCTION

The inventors believe that a need exists in the art for improvements in how information about sporting events, such as score information, is collected and shared with interested parties. Efficient collection of sporting event information in near real-time from a venue for that sporting event in an automated fashion is challenging. This challenge is especially acute in connection with amateur sporting events, such as high school sports.

In an effort to satisfy such needs, the inventors disclose as an exemplary embodiment a method for capturing data about a sporting event and communicating the sporting event data to a destination, the method comprising: (1) receiving data about a sporting event, (2) generating a uniform resource locator (URL), the URL comprising a domain name portion and a portion following the domain name portion, the portion following the domain name portion comprising at least a portion of the received data about the sporting event, and (3) sending the generated URL to the destination as a URL request over a network, and wherein the method steps are performed by a processor. The received data may comprise score data for the sporting event. Furthermore, the receiving step may comprise the processor receiving the score data from a scoreboard, the scoreboard being located at a venue where the sporting event is occurring. The scoreboard can be associated with a scoreboard identifier, and the portion of the URL following the domain name portion may further comprise the scoreboard identifier. The received score data can comprise score data in a format of the scoreboard, and the portion of the URL following the domain name portion further may comprise at least a portion of the score data in the scoreboard's format. Further still, as an example, the venue can be a school, and the sending step can comprise the processor sending the generated URL to the destination via a computer network of the school by emulating a transmission of a URL request from a browser. In doing so, the method can be practiced with minimal disruption to the school's computer network (e.g., without a requirement to modify the network's firewall settings).

As another exemplary embodiment, the inventors disclose an apparatus for capturing data about a sporting event and communicating the sporting event data to a destination, the apparatus comprising a processor and a memory, wherein the processor and memory are configured to (1) receive data about a sporting event, (2) generate a uniform resource locator (URL), the URL comprising a domain name portion and a portion following the domain name portion, the portion following the domain name portion comprising at least a portion of the received data about the sporting event, and (3) send the generated URL to the destination as a URL request over a network.

As still another embodiment, the inventors disclose a computer program product for capturing data about a sporting event and communicating the sporting event data to a destination, the computer program product comprising a plurality of instructions resident on a nontransitory computer-readable storage medium, the instructions being executable by a processor to (1) receive data about a sporting event, (2) generate a uniform resource locator (URL), the URL comprising a domain name portion and a portion following the domain name portion, the portion following the domain name portion comprising at least a portion of the received data about the sporting event, and (3) send the generated URL to the destination as a URL request over a network.

Moreover, the inventors also disclose a method for loading score data about a sporting event into a database, the method comprising: (1) receiving information about a sporting event, the information comprising score data in an encoded format and an identifier for a scoreboard at a venue where the sporting event is occurring, (2) identifying a translation process for the encoded score data based on the scoreboard identifier and sporting event schedule data, (3) translating the encoded score data to a decoded format based on the identified translation process, and (4) storing the decoded score data in a database, and wherein the method steps are performed by a processor. The method may further comprise the processor maintaining a data structure in a memory, the data structure associating a plurality of translation processes with a plurality of scoreboard identifiers and with sporting event schedule data, and wherein the identifying step comprises the processor accessing the data structure based on the scoreboard identifier to determine which of the translation processes is applicable to the encoded score data. The data structure can comprise a schedule data structure and a translation data structure, wherein the schedule data structure comprises a plurality of data items representative of a plurality of different scheduled sporting events, each sporting event data item being associated with a date/time and a scoreboard identifier for the scoreboard at the venue where the sporting event is scheduled to occur, wherein the translation data structure comprises a plurality of data items representative of the translation processes, each translation process data item being associated with a sporting event identifier and a scoreboard identifier for the scoreboard at the venue where the sporting event is scheduled to occur, and wherein the identifying step comprises the processor (1) identifying the sporting event for the encoded score data by applying the scoreboard identifier in the received information and data representative of a current date and time to the schedule data structure, and (2) identifying the translation process applicable to the encoded score data by applying the identified sporting event and the scoreboard identifier in the received information to the translation data structure. The method steps may be performed for a plurality of different sporting events occurring at a plurality of different venues with a plurality of different scoreboards, wherein the received information for the plurality of different sporting events comprises score data encoded in a plurality of different formats, and wherein the translating step comprises translating the score data encoded in the different formats to a common format using a plurality of identified translation processes. Such a method can be particularly useful when operated in connection with multipurpose scoreboards.

As another exemplary embodiment, the inventors disclose an apparatus for loading score data about a sporting event into a database, the apparatus comprising a processor and a memory, wherein the processor and memory are configured to (1) receive information about a sporting event, the information comprising score data in an encoded format and an identifier for a scoreboard at a venue where the sporting event is occurring (2) identify a translation process for the encoded score data based on the scoreboard identifier and sporting event schedule data, (3) translate the encoded score data to a decoded format based on the identified translation process, and (4) store the decoded score data in a database.

Still further, the inventors disclose a computer program product for loading score data about a sporting event into a database, the computer program product comprising a plurality of instructions resident on a nontransitory computer-readable storage medium, the instructions being executable by a processor to (1) receive information about a sporting event, the information comprising score data in an encoded format and an identifier for a scoreboard at a venue where the sporting event is occurring (2) identify a translation process for the encoded score data based on the scoreboard identifier and sporting event schedule data, (3) translate the encoded score data to a decoded format based on the identified translation process, and (4) store the decoded score data in a database.

As yet another exemplary embodiment, disclosed herein are techniques whereby advertisements are selected for delivery to users in a targeted manner based on factors such as the sporting event interests of the users and other targeting rules.

These and other features and advantages of the present invention will be apparent to those having ordinary skill in the art upon review of the following description and drawings.

BRIEF DESCRIPTION OF THE DRAWINGS

FIG. 4 depicts another exemplary data capture embodiment;

FIG. 5 depicts yet another exemplary data capture embodiment;

DETAILED DESCRIPTION

Figure 1:
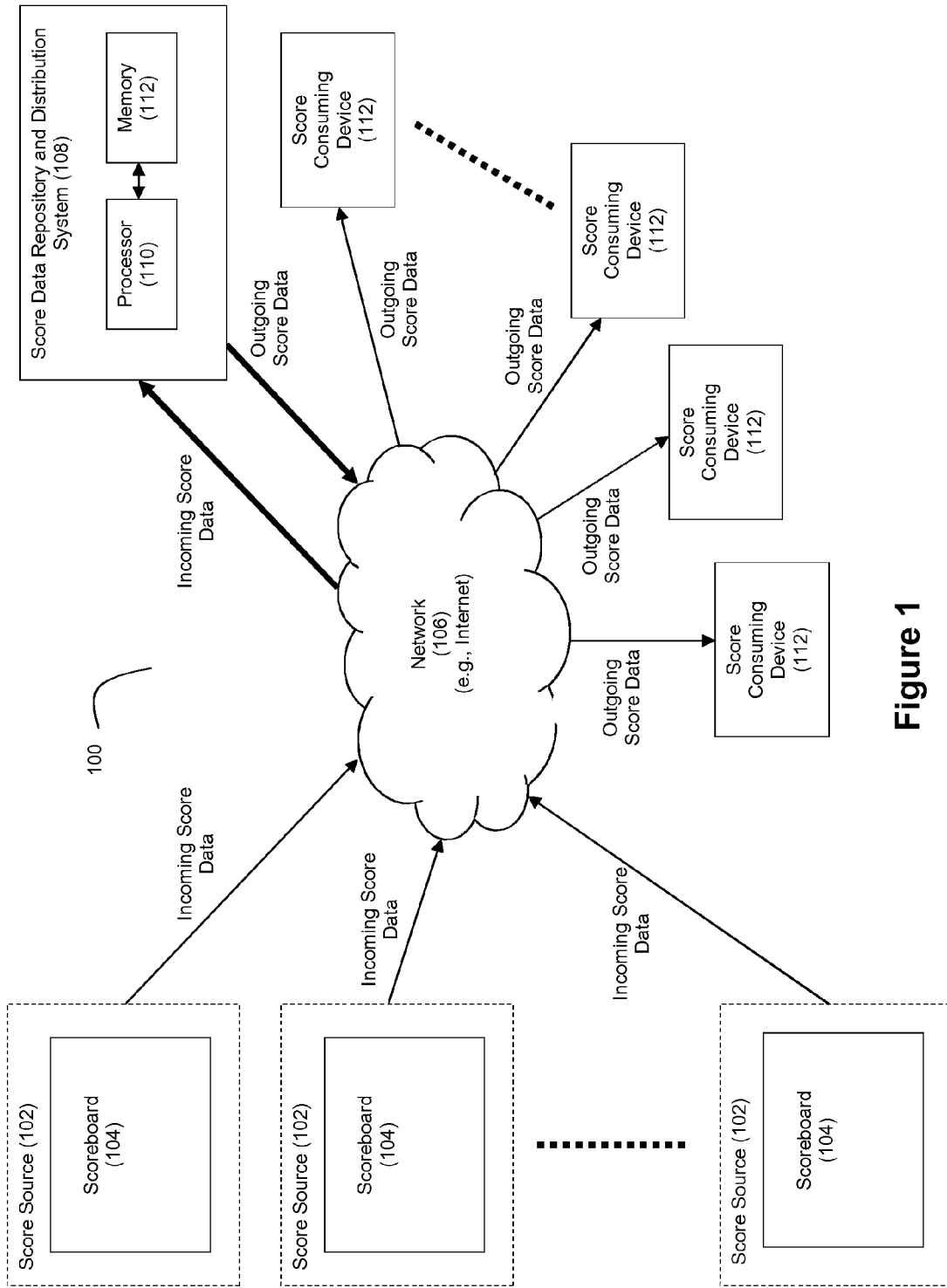
FIG. 1 depicts an exemplary sporting event information sharing system.

FIG. 1 depicts an exemplary sporting event information sharing system 100. While embodiments described herein relate to examples where the sporting event information being collected and distributed is score data, it should well be understood that the sporting event information can include information other than or in addition to scores.

The score data is generated by a plurality of score sources 102. Score sources 102 are expected to be spread over a wide geographic area. For example, the score sources 102 can be located in various high schools. The score sources 102 can include one or more scoreboards 104. As is well-known, scoreboards are devices that track a score for a sporting event in near real-time. For example, in many instances, a scoring official who is observing a sporting event will update the scoreboard as the sporting event progresses. For many sports and for many score sources, the scoreboards comprise an electronic data entry component and an electronic display component, where the electronic display component is positioned to display the score of a sporting event for easy viewing by spectators who are in attendance at the sporting event (e.g., a basketball game). The electronic data entry component can be positioned proximate to the scoring official, and it can be configured to communicate with the electronic display device via a wired or wireless connection. Furthermore, the electronic data entry component can be a component packaged with the electronic display device by a scoreboard manufacturer or it can be a computer (e.g., laptop) equipped with appropriate software for communicating with the electronic display device.

A wide variety of scoreboards are in use at score sources around the country and world. Scoreboards can not only vary by sport (e.g., baseball scoreboards are often different than football scoreboards), but can also vary by manufacturer. For example, the formatting of the score data maintained by scoreboards will often vary widely by manufacturer, even for scoreboards relating to the same sport. Further still, many scoreboards serve as multi-purpose scoreboards to provide score functionality for multiple sports. For example, a scoreboard in a high school gymnasium will often be configured to support scoring functions for sports such as basketball and volleyball.

Thus, it should be understood that the score data maintained by scoreboards 104 over multiple score sources 102 is expected to have a wide variety of formatting and content differences based on factors such as the sport involved and the manufacturer of the scoreboard.

The system 100 involves score data being communicated from the score sources 102 to a score data repository and distribution system 108 via a network 106. The network 106 can be any data communication network capable of communicating data from a score source 102 to the score data repository and distribution system 108. The network can be a combination of different networks such as a combination of wired and wireless networks. The Internet is an example of a network that is suitable to serve as network 106. However, it should be understood that other networks such as private data communication networks could also be used.

The score data repository and distribution system 108 can comprise a processor 110 and memory 112. The processor 110 and memory 112 can be configured to maintain the received score data from the various score sources 102 in a format suitable for access over a network such as network 106 by a plurality of score consuming devices 112.

The score consuming devices 112 can be devices used by persons who have an interest in any of the scores maintained by the score data repository and distribution system 108. For example, the score consuming devices 112 can be desktop or laptop computers that access, via a browser program, a website on which score data is published. Similarly, a mobile computing device such as a smart phone can serve as a score consuming device 112. The score data repository and distribution system 108 can make score data available to score consuming devices via any of a number of techniques. For example, a website can make score data generally available to interested persons. As another example, interested persons can set up user accounts and register their interest in being notified of scores for particular sports, teams, and/or high schools, etc. The score data repository and distribution system 108 can then be configured to push the relevant scores to the various users for display to those users through their score consuming devices 112. In instances where a smart phone is used as a score consuming device 112, a mobile application (or "app") can be executed by the smart phone to obtain and display scores that of interest to the user. The score data repository and distribution system 108 can also be configured to maintain a social network for users, where this social network is capable of distributing score information for sharing among multiple users. The score data repository and distribution system 108 can also be configured to post score data to a third party social network for similar sharing purposes.

Figure 2:
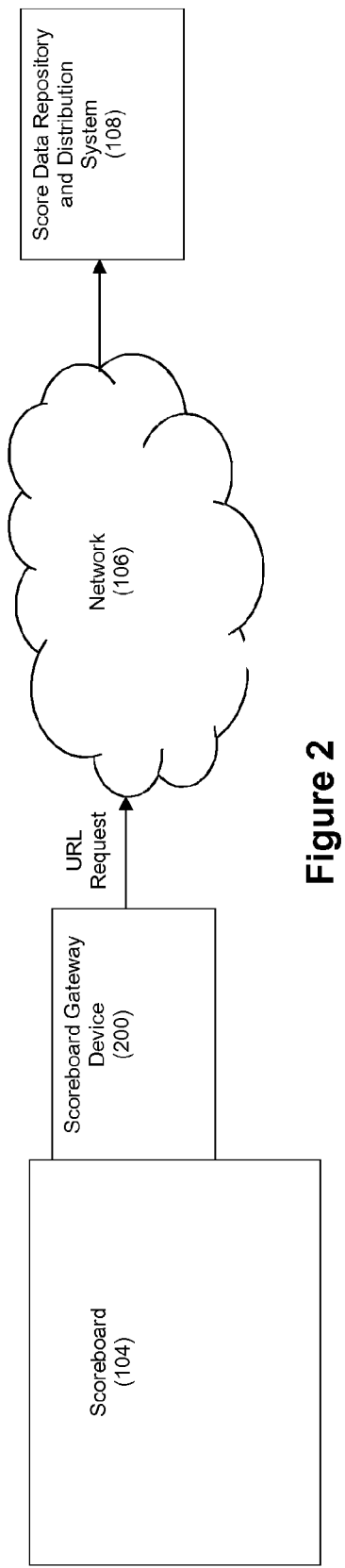
FIG. 2 depicts an exemplary data capture embodiment.

Data Capture:

FIG. 2 depicts an exemplary embodiment illustrating how score data can be captured from a scoreboard 104. In this example, a scoreboard gateway device 200 is in communication with the scoreboard 104. The scoreboard gateway device can be a physical device having a processor and memory that are configured to receive score data from the scoreboard 104 and communicate the received score data to the network 106 via a uniform resource locator (URL) request, as explained below.

Most scoreboards are configured such that the score data maintained by them are accessible to other electronic devices. For example, a connector port on a scoreboard can provide access to the scoreboard's score data. Thus, the scoreboard gateway device 200 can connect to the scoreboard 104 through such a connector port. Most scoreboards operate over wired connections designed to operate over great distances. A common input hardware is a current loop. Examples of connection types to various scoreboard models include BNC connectors, phono plug connectors, RCA jacks, twisted-pair connections, etc. Examples of scoreboards 104 to which a scoreboard gateway device can be connected include scoreboards that are available from Nevco of Greenville, Ill. However, it should be understood that scoreboards of other manufacturers could also be used by a practitioner.

Figure 3:
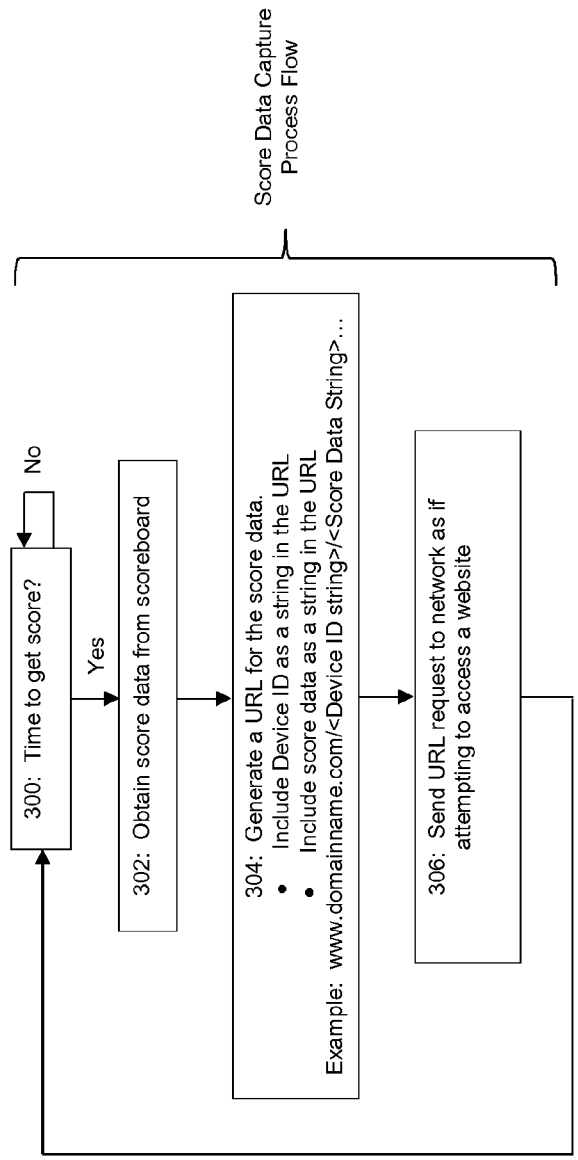
FIG. 3 depicts an exemplary process flow for data capture.

A non-transitory computer-readable storage medium such as computer memory resident in the scoreboard gateway device 200 can store computer-executable instructions for execution by a processor to implement a process flow such as that of FIG. 3 to capture score data.

At step 300, the processor determines whether it is time to obtain score data. If yes, the processor proceeds to step 302. Otherwise, the processor remains at step 300 until a determination is made that it is time to obtain score data. The processor can be configured to determine that it is time to obtain score data in a number of fashions. For example, the processor can be configured to obtain the score data at a programmable rate (e.g., obtain an update every second, etc.). As another example, the processor can be configured to obtain score data on a triggered basis, such as in response to a user request.

At step 302, the processor obtains score data from the scoreboard 104. Typically, a controller for a scoreboard will be streaming out score data to an output port at a high rate (e.g., every $1/1000^{th}$ of a second). In an exemplary embodiment, the scoreboard gateway device 200 does not need score data at such a high rate, and it can limit its intake of score data to a configurable rate (e.g., 1 score update per second). The obtained score data will typically be in digital form as a plurality of data bytes that are representative of a current score state of the sporting event. The formatting of these bytes to represent the score will vary from scoreboard model to scoreboard model. For example, the baud rates and/or modulation techniques for the data vary by scoreboard manufacturer. Thus, the scoreboard gateway device 200 can include configurable settings for reading received score data in view of the baud rate and/or modulation technique of the scoreboard 104 to which it is connected. The content of the score data can also vary by scoreboard manufacturer, with some scoreboards providing basic scoring information such as time, score (home and away), period, ball location (if applicable), team fouls (if applicable), etc. Other scoreboards can be configured to provide richer score data including information such as player statistics. Similarly, some scoreboards can be configured to communicate team names, while others simply use a home/away or generic Team 1/Team 2 structure. The scoreboard gateway device 200 can be configured to accommodate all such types of score data.

At step 304, the processor generates a URL for communicating the score data to the score data repository and distribution system 108 over network 106. The generated URL can comprise a domain name portion and a portion following the domain name portion. The portion following the domain name portion can comprise a plurality of characters that serve as an identifier for the scoreboard 104 and a plurality of characters that represent the obtained score data. For example, the portion following the domain name portion can comprise an identifier string for identifying the scoreboard and a score data string for representing the obtained score data. In such a case, the generated URL can take a form such as:

www.domainname.com/<deviceID>/<score_data_string>

The scoreboard identifier can be an identifier that uniquely identifies the scoreboard 104. For example, the system 100 can define a unique identifier for all scoreboards 104 within the system (e.g., each scoreboard having an assigned unique code within the system). The scoreboard gateway device 200 that connects with a particular scoreboard 104 can then store this unique identifier for pairing with that scoreboard's score data. Thus, when the URL is generated, the unique identifier can be included in the URL portion following the domain name portion. The scoreboard identifier can also identify the scoreboard by a combination of parameters such as an identifier for a scoreboard make/model and an identifier for the scoreboard's venue (e.g., a particular high school, a particular high school gymnasium or sporting field, etc.). In yet another example, the scoreboard identifier can be an identifier for the particular scoreboard gateway device 200 with which the scoreboard is paired. In such an implementation, when the scoreboard gateway device 200 is manufactured, it can be provided with a serialized identifier (e.g., a barcode). A programming procedure in the factory can scan such a barcode and program it into the memory of the scoreboard gateway device 200. This identifier can then be read out of the gateway device's memory and stored in a database as an identifier for the scoreboard gateway device 200. When the scoreboard gateway device 200 is deployed at a score source, where the score source can be registered in the database by information such as address, time zone, scoreboard make/model, etc.), the database can pair the identifier for the scoreboard gateway device with the scoreboard venue such that the scoreboard gateway device identifier also serves as a scoreboard identifier. The scoreboard gateway device 200 can then output its own serial number with the outgoing score data as the Device ID.

The score data string can simply be the obtained score data presented as a serial character string. As noted, different scoreboard models will provide score data in different formats. This formatting may be different in terms of the fields that are included in the score data, the organization of fields within the score data, and/or the encoding of data values within such fields.

Thus, a simple general example can be explained for score data from scoreboard model A where the score data may be formatted as:

<Field 1> <Field 2> <Field 3> <Field 4> <Field 5> <Field 6> . . .

where Field 1 can be a 32 character field for identifying the home team, Field 2 can be a 32 character field for identifying the away team, Field 3 can be a 10 character field for identifying the home team score in decimal format, Field 4 can be a 10 character field for identifying the away team score in decimal format, Field 5 can be a 5 character field for identifying the phase of the game in decimal format (e.g., $2^{nd}$ quarter, $1^{st}$ half, etc.), and Field 6 can be an 8 character field for identifying the time remaining in the current phase of the game in a mm:ss format.

As noted, scoreboard model B may present score information in a different format, even if for the same sport. Moreover, as should be well understood, if scoreboard model B is configured to provide scoring functions for a different sport, the formatting can be significantly different than that for scoreboard model A. For example, the formatting used to report a baseball score will be significantly different than the formatting used to report a football score.

The score data from the scoreboard can be organized in a format having a header followed by a payload in which the data values representing the score is present. With such a packetized arrangement, it should be understood that the packets can exhibit a fixed size or a variable size. Header information will provide information about the packet, including whether the size is fixed or variable. Fields within the payload can be indexed with fixed fields or variable-sized fields (e.g., the first two bytes are score, the next four bytes are time, the next byte is period, etc.). In some situations, the payload may be followed by a checksum. However, this description is only exemplary, and score data can be communicated via different organizations and protocols.

While the example discussed above and shown in step 304 of FIG. 3 illustrates that the URL portion following the domain name comprises an initial string for the scoreboard identifier followed by separation/delimiter character ("/"), followed by the score data string, it should be understood that the scoreboard identifier can be presented after the score data string or interleaved within the data of the score data string. Furthermore, a separation/delimiter character need not be used to delineate the scoreboard identifier and the score data string. For example, the first X or last X characters of the URL portion following the domain name portion can be reserved for the scoreboard identifier, in which case a separation/delimiter character would not be needed to parse the URL at the receiving end.

At step 306, the processor sends the generated URL as a URL request to the network 106 for delivery to the score data repository and distribution system 108 as if the processor were attempting to access a website. The processor can emulate a browser by sending the same TCP/IP packets that a browser would send as a URL request to implement the HTTP protocol. In an exemplary embodiment, the processor connects to network 106 through an existing computer network present at the score source 102. By emulating a browser's URL request to communicate score data to the score data repository and distribution system 108, the scoreboard gateway device 200 is minimally disruptive to the score source 102 in which the scoreboard gateway device 200 is deployed. For example, in an embodiment where the scoreboard 104 is located at a high school and the scoreboard gateway device 200 is configured to access the network 106 through the high school's computer network, the use of URL requests as described by FIG. 3 permits the scoreboard gateway device to be installed and operated with minimal to no reconfigurations needed for the school's network and firewall system. The reason for this is that to the school network and its firewall, the URL requests sent at step 306 appear as ordinary web traffic emanating from a browser on a computer within the school network. The network 106 will route the URL request to a server corresponding to the domain name portion of the URL, and this server can then extract the URL portion following the domain name portion to be processed to extract the score data therefrom.

It should be understood that arrangements other than that shown by FIG. 2 can be used to capture score data from a scoreboard 104. For example, FIG. 4 depicts an exemplary data capture embodiment where the intelligence to execute at least part of the process flow of FIG. 3 is resident on the scoreboard 104 itself. A processor 400 and memory 402 within the scoreboard 104 can be configured to perform the steps described in FIG. 3 and send score data over network 106 to the score data repository and distribution system 108. With such an embodiment, the need for a separate scoreboard gateway device 200 can be obviated if desired by a practitioner.

As another example shown by FIG. 5, at least part of the process flow of FIG. 3 can be deployed in the pre-existing computer infrastructure of the score source 102. For example, in instances where the score source 102 includes a local computer network 500, the steps of FIG. 3 can be performed by a processor 500 and memory 502 within that network 500. Continuing with the high school example, the high school's computer network will already likely include a number of computers. If at least one of these computers is set up to receive a feed of score data from the scoreboard 104 (e.g., a laptop used by a scoring official at a sporting event), such a computer can also execute the process flow of FIG. 3 to communicate the score data to the score data repository and distribution system 108. The embodiment of FIG. 5 can thus also obviate the need for a separate scoreboard gateway device 200 if desired by a practitioner.

For still other embodiments, a scoreboard gateway device can be deployed in an arrangement similar to that shown by FIG. 5 but where the scoreboard gateway device connects to the scoreboard to access the score data and provide this score data to the local computer network 500, where the processor 500 and memory 502 are configured to then execute the process flow on the score data received from the scoreboard gateway device. In still another variation, the scoreboard gateway device could also be configured to perform step 304, and where the generated URL is then passed to the processor 500 and memory 502 for step 306 to be performed.

In a variation on the embodiment of FIG. 4, the processing logic resident in the scoreboard 104 can be configured to perform steps 300-304 while an attached scoreboard gateway device can be configured to perform step 306. Still other variations can be implemented.

Figure 6:
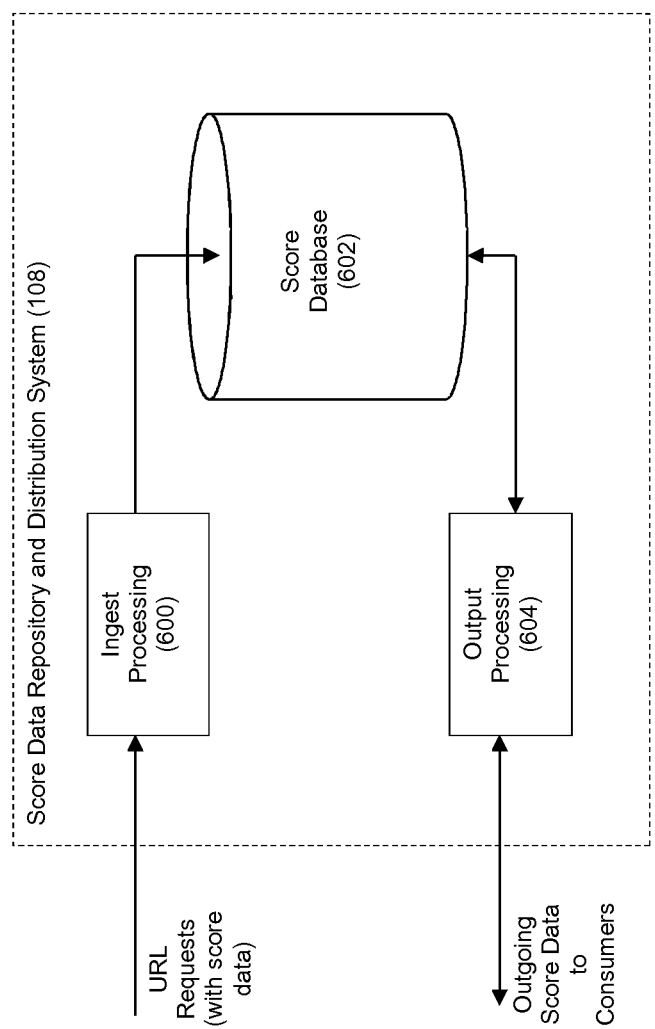
FIG. 6 depicts an exemplary score data repository and distribution system.

Data Translation:

FIG. 6 depicts an exemplary embodiment for a score data repository and distribution system 108. The system 108 can comprise processing logic configured to provide ingest processing 600 of score data for loading the score data into a score database 602. The system 108 can also comprise processing logic configured to provide output processing 604 of score data from the score database 602 for distribution to one or more score consuming devices 112.

The ingest processing 600 can be performed by one or more servers. Such one or more servers can be configured to receive the URL requests described in connection with FIG. 3 from the score sources 102 via network 106. Similarly, the output processing 604 can be performed by one or more servers, and these one or more servers need not be the same one or more servers that perform the ingest processing 600.

Figure 7:
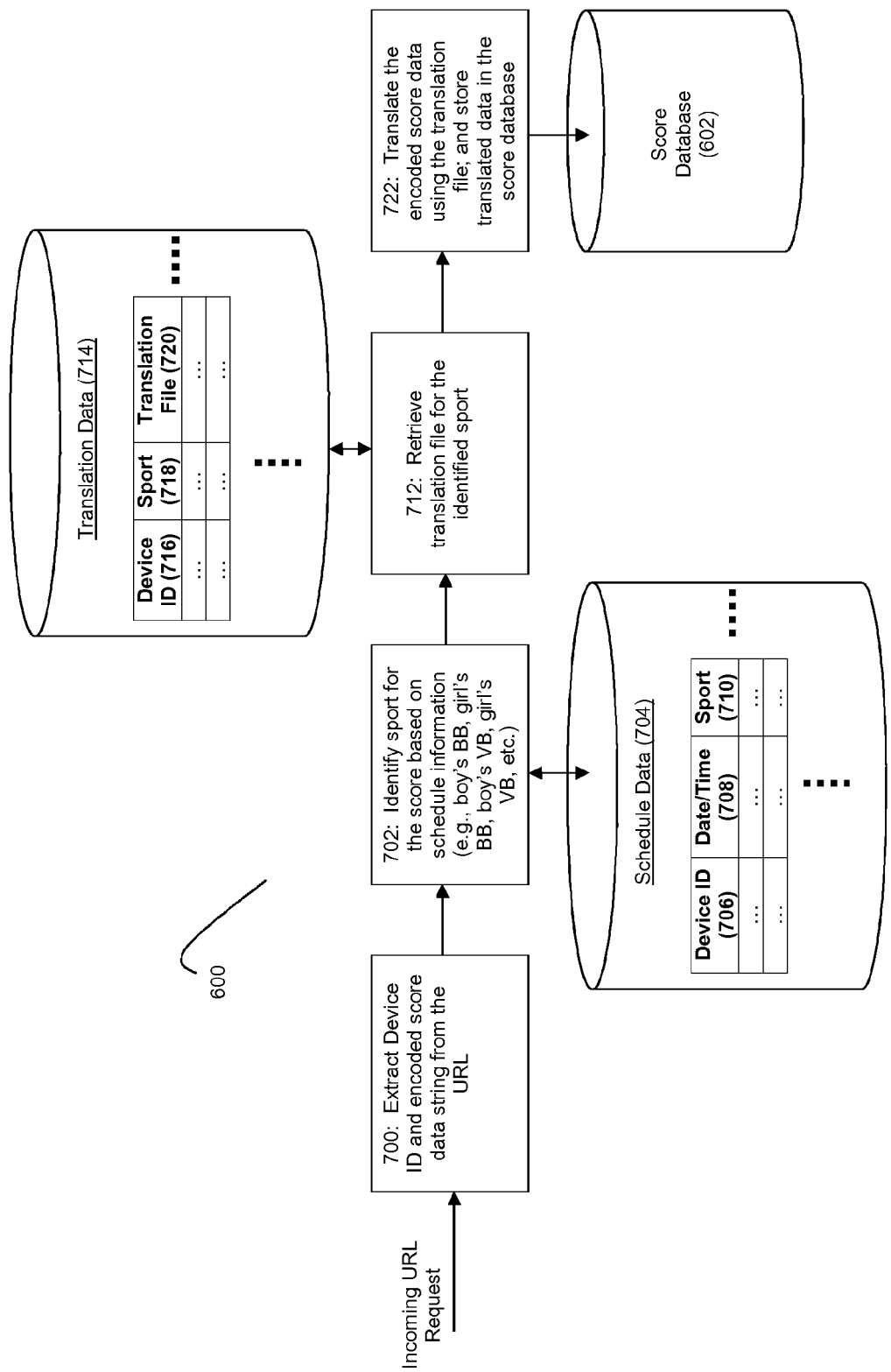
FIG. 7 depicts an exemplary process flow for score data translation to build a database of score data.

FIG. 7 depicts an exemplary process flow that can be performed as part of ingesting processing 600 to load score data into database 602. A non-transitory computer-readable storage medium such as computer memory resident in a processor of a server within the score data repository and distribution system 108 can store computer-executable instructions for execution by a processor to implement FIG. 7's process flow.

At step 700, the processor receives an incoming URL request from a score source 102. As previously discussed, the various URL requests that the processor will receive from the various score sources 102 in the system 100 will contain score data in a plurality of different formats for a plurality of different sports. One of the primary tasks for ingest processing 600 is to translate such score data to a format suitable for networked end-user distribution from database 602 with a high degree of automation. At step 700, the processor parses the received URL request to extract the scoreboard identifier and encoded score data string contained therein. For example, in an embodiment where the URL is structured such that the URL portion following the domain name portion includes a field for a scoreboard identifier followed by a field for the score data, the processor at step 700 can simply extract that relevant data from each field using foreknowledge about the fields' formatting and/or separation.

The extracted score data will be encoded in a manner that is particular to a given make and model of scoreboard 104 as well as the sport for which the score data is reporting a score. This can pose significant challenges for automated processing. Accentuating this challenge are instances where the scoreboard in question is a multi-purpose scoreboard used to report the scores for a plurality of different sports. Multi-purpose scoreboards are especially common in places such as high school gymnasiums where sports such as basketball and volleyball are likely to be played using the same scoreboard. To solve this problem, at step 702, the processor accesses a schedule data structure 704 in a memory to determine a sport for the extracted score data.

The schedule data structure 704 can be configured to associate a sporting event at a particular date/time with an identifier for the scoreboard 104 that will be used to report the scores for that sporting event. For example, the data structure 704 can comprise a plurality of sport identifiers 710, each being associated with a date/time identifier 708, and a scoreboard identifier 706. These data items can be stored as a relational data structure in a computer memory to serve as a schedule database. The content of the schedule database can be periodically updated by an administrator or other means. Thus, at step 702, the processor can access the schedule data structure using the extracted scoreboard identifier from the URL request and the current date/time to locate the appropriate sports identifier 710 for the score data in question. Depending upon the nature of the sports and the rules for a particular sport, the sport may need to be identified with a high degree of precision. For example, in a high school context, if girls' basketball and boys' basketball are played with different conventions (such as using halves instead of quarters to govern time), the encoding of score data for boys' basketball may be different than that for girls' basketball. Similar considerations can be at play in connection with age differences (e.g., varsity boys' basketball versus freshmen boys' basketball). As such, the schedule data structure 704 can be configured to identify the relevant sport with particularity. Moreover, even if not needed for the purpose of decoding the score data, identification of the particular sport at step 702 can be desirable for the purpose of updating the database 602.

Then, at step 712, the processor can access a translation data structure 714 in a memory to determine how the extracted score data should be translated for loading into score database 602. Once again, different scoreboard makes and models will encode their score data in different formats. A plurality of translation files can be maintained by the system 108, where each translation file governs how the encoded score data for a particular scoreboard make/model is to be decoded to generate normalized score data that can be loaded into database 602. The translation data structure 714 can associate these translation files with a scoreboard identifier 716 and a sport identifier 718. However, it should be understood that other mechanisms can be employed to associate translation files with information that permits the processor to look up the appropriate translation file to use for decoding. For example, for each scoreboard make/model that requires a specific translation function, an association can be created in the memory for an identifier for such scoreboard make/model and its corresponding translation file. These data items can be stored as a relational data structure in a computer memory to serve as a translation database. Thus, at step 712, the processor can determine and retrieve the relevant translation file for the score data in question using the translation data structure 714 in combination with the extracted scoreboard identifier and the sport identifier determined at step 702. The translation file data item 720 in the translation data structure 714 can be the translation file itself or a pointer to the relevant translation file in memory.

The translation file can take any of a number of forms. An exemplary translation file can be an XML data structure that defines how fields of the extracted score data are to be mapped to fields for storage in the score database. Appendix A includes an example of a translation file that can be employed for a basketball scoreboard, Model MPC5/6 available from Nevco of Greenville, Ill. However, it should be understood that the translation files can take other forms, particularly given the variety of encoding techniques that can be encountered among different makes and models of scoreboards. In the exemplary embodiment where the translation files are maintained by system 108, it should be understood that the system is capable of flexibly adapting to new scoreboards that may enter the marketplace or responding to a demand for access to richer data from end users. For example, if a new scoreboard model with its own decoding needs becomes available, the system can quickly support that scoreboard model by adding a translation file for it. Similarly, if the system was not previously capturing all of the items of score data provided by a scoreboard, but a demand arises from an end user to have access to such data (e.g., end users who may want to track the shot clock for a basketball game while following that basketball game), such a demand can be quickly accommodated by updating the translation file for that scoreboard to include a translation function for the encoded shot clock data in the extracted score data (see the "shot time" translation in Appendix A for example).

At step 722, the processor translates the extracted score data using the retrieved translation file to obtain decoded score data. This decoded score data can then be loaded into score database 602, from which it is now available for sharing with the score consuming devices 112.

While the example of FIG. 7 shows the use of separate data structures for the schedule data and the translation data, it should be understood that these two data structures can be consolidated if desired by a practitioner. For example, the sport and scoreboard identifier fields in the two data structures can be used as a common key to collapse the two data structures. For example, a data structure table can be employed where the translation file data item 720 is associated with a scoreboard identifier field and a date/time identifier field to permit a more direct lookup of the relevant translation file based on the extracted scoreboard identifier and the current date/time. In such an arrangement, steps 702 and 712 would effectively consolidated into a single memory access operation.

Furthermore, in some instances, it may be desirable to encrypt the data being sent over the network 106 to the score data repository and distribution system 108, in particular the portion of URL following the domain name portion. In such instances, step 304 of FIG. 3 can include a step of encrypting the scoreboard identifier and/or score data so that at least a portion of the URL portion following the domain name portion comprises cipher text. With such encryption, the security of the score data repository and distribution system 108 can be enhanced. Any known encryption technique suitable for encrypting the scoreboard identifier and/or score data can be used for this encryption.

When such encryption is employed, step 700 of FIG. 7 would also include a complementary decryption operation to decrypt the encrypted data in the URL portion following the domain name portion.

It should also be understood that the process flow of FIG. 7 will be repeated for numerous URL requests that are received by the system 108 from numerous score sources 102. Multiple processing threads and/or multiple load balancing ingest servers can be provided to handle the processing load that would arise from the receipt of numerous URL requests for the multiple sporting events that will often be occurring simultaneously at different locales. In some embodiments, different threads can be opened for a plurality of different sporting events such that the score data for the same sporting event is handled by the same thread to improve system performance. For example, once a thread is opened for a particular sporting event and while the sporting event is ongoing, the new URL requests received by the system which contain the same scoreboard identifier can be processed using the already retrieved translation file rather than requiring a repeated performance of steps 702 and 712. Processing logic can be used to direct the data for a received URL request to an appropriate thread. Further still, caching techniques available through Apache can be used to quickly retrieve data that will be repetitious in nature (which can also be employed for front end operations such as web page retrievals containing final scores that may be requested by hundreds of users per second).

Further still, while the example of FIG. 7 shows that schedule reconciliation step 702 and translation steps 712 and 722 are performed by system 108, it should be understood that one or both of these operations could optionally be deployed locally at venue where the score data is captured if desired by a practitioner. For example, the schedule data structure 704 can be migrated to the intelligence located at the sporting event venue used to execute the data capture flow. In such a case, the URL request send to the system 108 over network 106 can already include a sport identifier. However, it should be understood that such a migration would require extra administrative resources to ensure the various venues are kept up to date with accurate scheduling information. Similarly, the translation data structure 714 and the corresponding translation logic from FIG. 7 could also be migrated to the sporting event venue, in which case the URL request from the score source would include score data that has already been decoded.

With these exemplary embodiments, the score database 602 will thus reflect the current score state for a plurality of different sporting events. The database 602 can maintain the score data for completed sporting events to provide historical score information and not just score information for ongoing sporting events. The database 602 can take any of a number of forms, including as a relational database, an XML database, or others depending on the desires of a practitioner. Furthermore, it should be understood that the data stored by the database 602 for a given sporting event can be augmented with information beyond just score data, such as player performance information, team performance information, league standings, and the like. The database 602 can also take the form of a single database or a plurality of distributed databases, depending upon the desire of a practitioner.

Data Sharing:

As discussed above, the system 108 can be configured to share the score data with a plurality of score consuming devices 112 via network 106. The output processing 604 of the system 108 can be configured to support such data sharing in any of a number of manners.

For example, the system 108 can comprise one or more web servers that provide access to the score data in database 602 via a website. Such web servers can be configured to support a social network among users, whereby the different users are able to share score data with friends via the social network. Further still, the output processing 604 can include posting score data to one or more third party social networks (e.g., Facebook, Twitter, etc.).

The output processing 604 can also include interacting with users' score consuming devices 112 via mobile applications or the like. For example, a user can subscribe to one or more teams of interest through a mobile application executed by his or her smart phone, and the output processing 604 can include processing logic to provide the user's smart phone with score data for the teams of interest to the user.

With a wide base of users, advertising can be a useful source of revenue to an operator of system 108. That is, system 108 can deliver advertisements to score consuming devices along with score data. Moreover, the output processing 604 can be configured to provide highly targeted advertising to the users of such score consuming devices 112.

Knowledge of user's interest in a particular sports team, particularly at the high school level, can be helpful information for marketing purposes. Further still, with knowledge of a pool of users who share an interest in a particular team or sporting event, the system is able to reach a highly targeted pool of users that may not otherwise be specifically available as a group to an advertiser.

As such, advertisement selection rules can be deployed that operate to define the conditions under which various advertisements will be selected for delivery to various score consuming devices. For example, an advertisement selection rule can be a rule that Advertisement X is to be delivered to all users to who have expressed an interest in scores for High School A. Another advertisement selection rule can be a rule that Advertisement Y is to be delivered to all users who are following the score of a particular game between High School C and High School D. Yet another example of an advertisement selection rule can be a rule that Advertisement Z is to be delivered to all users who are following the score of a girls' sport in a particular metropolitan area or subarea. These and countless other advertisement selection rules can be implemented as part of the output processing 604. By parameterizing advertisement selection rules in this fashion (e.g., any combination of schools, games, venues, and teams), a practitioner of the system can accommodate highly specific targeting requests from advertisers.

Figure 8:
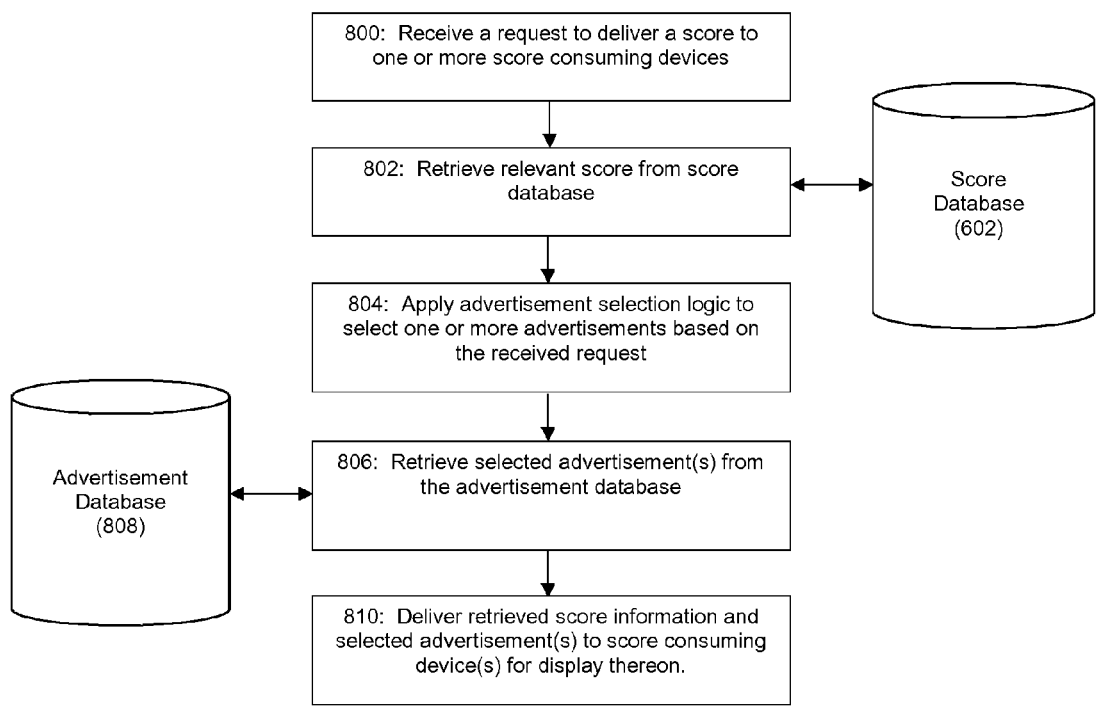
FIG. 8 depicts an exemplary process flow for delivering score data to a consumer.

FIG. 8 depicts an exemplary process flow for delivering score data to a score consuming device, including an advertisement delivery feature. A non-transitory computer-readable storage medium such as computer memory resident in a processor of a server within the score data repository and distribution system 108 can store computer-executable instructions for execution by a processor to implement FIG. 8's process flow. The system 108 can also maintain a database 808 in which a plurality of different advertisements eligible for selection and delivery to score consuming devices are stored. These advertisements can be associated with one or more advertisement selection rules.

At step 800, a processor receives a request to deliver a score to one or more score consuming devices 112. This request may emanate directly from a score consuming device or it may be a request from the system itself that a score is to be delivered to a score consuming device (e.g., a score for a game is to be delivered to the users who have subscribed to that game).

At step 802, the processor retrieves the relevant score data from the score database 602. The retrieved data can include information beyond just the score for the game.

At step 804, the processor applies advertisement selection logic to identify one more advertisements that are to be delivered to a score consuming device in response to the request at step 800. This advertisement selection logic can apply a plurality of advertisement selection rules to a domain of data that is relevant to the situation. Examples of data that could be considered by such advertisement selection rules include information known about the user (e.g., demographic information such as age, location, interests, etc., where such information can be determined from registration information that a user may have supplied), information about the sporting event in question (e.g., the teams involved, the location of the sporting event, the importance of the sporting event, etc.), the time of day, time of year, etc.

At step 806, the one or more advertisements selected as a result of step 804 are retrieved from the advertisement database 808. Then, at step 810, the processor delivers the retrieved score data and the retrieved advertisement(s) to one or more score consuming devices over network 106 for display on such one or more score consuming devices. As should be well understood, the advertisements can take the form of text, audio, and or graphic (e.g., video) content depending upon the desires of a practitioner. Moreover, the revenue arrangement for the delivery of such advertisements can be a matter of private negotiation between an operator of system 108 and an advertiser.

While the present invention have been described above in relation to exemplary embodiments, various modifications may be made thereto that still fall within the invention's scope as will be recognizable upon review of the teachings herein. As such, the full scope of the present invention is to be defined solely by the appended claims and their legal equivalents.

APPENDIX A

Sample Translation File for Nevco Basketball Scoreboard Model MPC5/6

```
<?xml version="1.0" encoding="Windows-1252" standalone="yes"?>
<MPC_Model_Code xmlns="134">
   <MAIN_TIME>
   <TENTH_SECONDS>
      <ONES>
         <ADDRESS>S1</ADDRESS>
      </ONES>
   </TENTH_SECONDS>
   <SECONDS>
      <ONES>
         <ADDRESS>N5</ADDRESS>
      </ONES>
      <TENS>
         <ADDRESS>N6</ADDRESS>
         <MASK>7</MASK>
      </TENS>
   </SECONDS>
   <MINUTES>
      <ONES>
         <ADDRESS>N7</ADDRESS>
         <MASK>15</MASK>
      </ONES>
      <TENS NibbleCount="2">
         <NIBBLE1>
            <ADDRESS>N8</ADDRESS>
            <MASK>3</MASK>
         </NIBBLE1>
         <NIBBLE2>
            <ADDRESS>S2</ADDRESS>
            <MASK>12</MASK>
         </NIBBLE2>
      </TENS>
   </MINUTES>
   </MAIN_TIME>
   <AUX_TIME>
   <SECONDS>
      <ONES>
         <ADDRESS>S10</ADDRESS>
      </ONES>
      <TENS>
         <ADDRESS>S11</ADDRESS>
         <MASK>7</MASK>
      </TENS>
   </SECONDS>
   <MINUTES>
      <ONES>
         <ADDRESS>S12</ADDRESS>
      </ONES>
      <TENS>
         <ADDRESS>S13</ADDRESS>
      </TENS>
   </MINUTES>
   <AUX_HORN>
      <ONES>
         <ADDRESS>S11</ADDRESS>
         <MASK>8</MASK>
         <RSHIFT>3</RSHIFT>
      </ONES>
   </AUX_HORN>
   </AUX_TIME>
   <SHOT_TIME>
   <SECONDS>
      <ONES>
         <ADDRESS>S14</ADDRESS>
      </ONES>
      <TENS>
         <ADDRESS>S15</ADDRESS>
         <MASK>7</MASK>
      </TENS>
   </SECONDS>
   <SHOT_HORN>
      <ONES>
         <ADDRESS>S15</ADDRESS>
         <MASK>8</MASK>
         <RSHIFT>3</RSHIFT>
      </ONES>
   </SHOT_HORN>
   </SHOT_TIME>
   <HOME>
   <SCORE>
      <ONES>
         <ADDRESS>N10</ADDRESS>
      </ONES>
      <TENS>
         <ADDRESS>N9</ADDRESS>
      </TENS>
      <HUNDREDS>
         <ADDRESS>N2</ADDRESS>
         <MASK>4</MASK>
```

```xml
        <RSHIFT>2</RSHIFT>
      </HUNDREDS>
    </SCORE>
    <POSSESSION_INDICATOR>
      <ONES>
        <ADDRESS>N4</ADDRESS>
        <MASK>4</MASK>
        <RSHIFT>2</RSHIFT>
      </ONES>
    </POSSESSION_INDICATOR>
    <FOULS>
      <ONES>
        <ADDRESS>N11</ADDRESS>
      </ONES>
      <TENS>
        <ADDRESS>N2</ADDRESS>
        <MASK>1</MASK>
      </TENS>
    </FOULS>
    <TIMEOUTS_LEFT>
      <ONES>
        <ADDRESS>S3</ADDRESS>
      </ONES>
    </TIMEOUTS_LEFT>
    <BONUS_INDICATOR>
      <ONES>
        <ADDRESS>N8</ADDRESS>
        <MASK>4</MASK>
        <RSHIFT>2</RSHIFT>
      </ONES>
    </BONUS_INDICATOR>
    <DOUBLE_BONUS_INDICATOR>
      <ONES>
        <ADDRESS>S7</ADDRESS>
        <MASK>4</MASK>
        <RSHIFT>2</RSHIFT>
      </ONES>
    </DOUBLE_BONUS_INDICATOR>
  </HOME>
  <GUEST>
    <SCORE>
      <ONES>
        <ADDRESS>N1</ADDRESS>
      </ONES>
      <TENS>
        <ADDRESS>N0</ADDRESS>
      </TENS>
      <HUNDREDS>
        <ADDRESS>N2</ADDRESS>
        <MASK>8</MASK>
        <RSHIFT>3</RSHIFT>
      </HUNDREDS>
    </SCORE>
    <POSSESSION_INDICATOR>
      <ONES>
        <ADDRESS>N4</ADDRESS>
        <MASK>8</MASK>
        <RSHIFT>3</RSHIFT>
      </ONES>
    </POSSESSION_INDICATOR>
    <FOULS>
      <ONES>
        <ADDRESS>N12</ADDRESS>
      </ONES>
      <TENS>
        <ADDRESS>N2</ADDRESS>
        <MASK>2</MASK>
        <RSHIFT>1</RSHIFT>
      </TENS>
    </FOULS>
    <TIMEOUTS_LEFT>
      <ONES>
        <ADDRESS>S4</ADDRESS>
      </ONES>
    </TIMEOUTS_LEFT>
    <BONUS_INDICATOR>
      <ONES>
        <ADDRESS>N8</ADDRESS>
        <MASK>8</MASK>
        <RSHIFT>3</RSHIFT>
      </ONES>
    </BONUS_INDICATOR>
    <DOUBLE_BONUS_INDICATOR>
      <ONES>
        <ADDRESS>S7</ADDRESS>
        <MASK>8</MASK>
        <RSHIFT>3</RSHIFT>
      </ONES>
    </DOUBLE_BONUS_INDICATOR>
  </GUEST>
  <GLOBAL_DATA>
    <GAME_PERIOD>
      <ONES NibbleCount="5">
        <NIBBLE1>
          <ADDRESS>N3</ADDRESS>
          <MASK>1</MASK>
        </NIBBLE1>
        <NIBBLE2>
          <ADDRESS>N3</ADDRESS>
          <MASK>2</MASK>
        </NIBBLE2>
        <NIBBLE3>
          <ADDRESS>N3</ADDRESS>
          <MASK>4</MASK>
          <RSHIFT>2</RSHIFT>
        </NIBBLE3>
        <NIBBLE4>
          <ADDRESS>N3</ADDRESS>
          <MASK>4</MASK>
          <RSHIFT>1</RSHIFT>
        </NIBBLE4>
        <NIBBLE5>
          <ADDRESS>N3</ADDRESS>
          <MASK>8</MASK>
          <RSHIFT>1</RSHIFT>
        </NIBBLE5>
      </ONES>
    </GAME_PERIOD>
    <HORN_STATE>
      <ONES>
        <ADDRESS>N6</ADDRESS>
        <MASK>8</MASK>
        <RSHIFT>3</RSHIFT>
      </ONES>
    </HORN_STATE>
    <PLAYER_NUMBER>
      <ONES>
        <ADDRESS>N13</ADDRESS>
      </ONES>
      <TENS>
        <ADDRESS>N14</ADDRESS>
      </TENS>
    </PLAYER_NUMBER>
    <PLAYER_FOULS>
```

```
        <ONES>
            <ADDRESS>N15</ADDRESS>
        </ONES>
    </PLAYER_FOULS>
    <END_OF_PERIOD>
        <ONES>
            <ADDRESS>S0</ADDRESS>
            <MASK>8</MASK>
            <RSHIFT>3</RSHIFT>
        </ONES>
    </END_OF_PERIOD>
    <TIME_ON_OFF>
        <ONES>
            <ADDRESS>S7</ADDRESS>
            <MASK>1</MASK>
        </ONES>
    </TIME_ON_OFF>
    <TIME_DIRECTION>
        <ONES>
            <ADDRESS>S2</ADDRESS>
            <MASK>1</MASK>
        </ONES>
    </TIME_DIRECTION>
</GLOBAL_DATA>
<DISPLAY_CONTROL>
<DIMMING_STATE>
    <ONES>
        <ADDRESS>S0</ADDRESS>
        <MASK>4</MASK>
        <RSHIFT>2</RSHIFT>
    </ONES>
</DIMMING_STATE>
<TIME_OF_DAY>
    <ONES>
        <ADDRESS>S7</ADDRESS>
        <MASK>2</MASK>
        <RSHIFT>1</RSHIFT>
    </ONES>
</TIME_OF_DAY>
<BASKETBALL_CAP_PLATE_FLAG>
    <ONES>
        <ADDRESS>N4</ADDRESS>
        <MASK>2</MASK>
        <RSHIFT>1</RSHIFT>
    </ONES>
</BASKETBALL_CAP_PLATE_FLAG>
<VBALL_WREST_CAP_PLATE_FLAG>
    <ONES>
        <ADDRESS>N4</ADDRESS>
        <MASK>1</MASK>
    </ONES>
<VBALL_WREST_CAP_PLATE_FLAG>
</DISPLAY_CONTROL>
</MPC_Model_Code>
```

What is claimed is:

1. A method for capturing data about a sporting event and communicating the sporting event data to a destination, the method comprising:
   receiving scoreboard data about a sporting event from a scoreboard;
   generating a uniform resource locator (URL), the URL comprising a domain name portion and a portion following the domain name portion, the portion following the domain name portion comprising at least a portion of the received scoreboard data; and
   sending the generated URL to the destination as a URL request over a network; and
   wherein the method steps are performed by a processor.

2. The method of claim 1 wherein the received scoreboard data comprises score data for the sporting event.

3. The method of claim 2 wherein the scoreboard is located at a venue where the sporting event is occurring.

4. The method of claim 3 wherein the scoreboard is associated with a scoreboard identifier, and wherein the portion of the URL following the domain name portion further comprises the scoreboard identifier.

5. The method of claim 4 wherein the scoreboard identifier comprises a scoreboard identifier configured to uniquely identify the scoreboard among a plurality of scoreboards.

6. The method of claim 4 wherein the received scoreboard data is in a format of the scoreboard, and wherein the portion of the URL following the domain name portion further comprises at least a portion of the scoreboard data in the scoreboard's format.

7. The method of claim 6 wherein the domain name portion of the URL comprises a domain name for a server at the destination.

8. The method of claim 2 wherein the URL generating step further comprises the processor encrypting at least part of the portion of the URL following the domain name portion.

9. The method of claim 4 wherein the venue is a school, and wherein the sending step comprises the processor sending the generated URL to the destination via a computer network of the school by emulating a transmission of a URL request from a browser.

10. The method of claim 2 further comprising the processor performing the method steps at a programmable rate.

11. The method of claim 2 wherein the processor is resident in a device in communication with the scoreboard.

12. The method of claim 11 wherein the device comprises a scoreboard gateway device.

13. The method of claim 11 wherein the device comprises a computer resident in a school's computer network.

14. The method of claim 2 wherein the processor is resident in the scoreboard.

15. An apparatus for capturing data about a sporting event and communicating the sporting event data to a destination, the apparatus comprising:
   a processor; and
   a memory; and
   wherein the processor and memory are configured to (1) receive scoreboard data about a sporting event from a scoreboard, (2) generate a uniform resource locator (URL), the URL comprising a domain name portion and a portion following the domain name portion, the portion following the domain name portion comprising at least a portion of the received scoreboard data, and (3) send the generated URL to the destination as a URL request over a network.

16. The apparatus of claim 15 wherein the received scoreboard data comprises score data for the sporting event.

17. The apparatus of claim 16 wherein the scoreboard is associated with a scoreboard identifier, and wherein processor and memory are further configured to include the scoreboard identifier in the portion of the URL following the domain name portion.

18. The apparatus of claim 17 wherein the scoreboard identifier comprises a scoreboard identifier configured to uniquely identify the scoreboard among a plurality of scoreboards.

19. The apparatus of claim 17 wherein the received scoreboard data is in a format of the scoreboard, and wherein processor and memory are further configured to include the score data in the scoreboard's format in the portion of the URL following the domain name portion.

20. The apparatus of claim 6 wherein the domain name portion of the URL comprises a domain name for a server at the destination.

21. The apparatus of claim 16 wherein processor and memory are further configured to encrypt at least part of the portion of the URL following the domain name portion prior to sending the generated URL to the destination.

22. The apparatus of claim 17 wherein processor and memory are further configured to send the generated URL to the destination via a computer network of a school at which the scoreboard is located via an emulation of transmission of a URL request from a browser.

23. The apparatus of claim 16 wherein processor and memory are further configured to perform the receive, URL generation, and send operations at a programmable rate.

24. The apparatus of claim 16 wherein the processor and memory are resident in a device in communication with the scoreboard.

25. The apparatus of claim 24 wherein the device comprises a scoreboard gateway device.

26. The apparatus of claim 24 wherein the device comprises a computer resident in a school's computer network.

27. The apparatus of claim 16 wherein the processor and memory are resident in the scoreboard.

28. A computer program product for capturing data about a sporting event and communicating the sporting event data to a destination, the computer program product comprising:
    a plurality of instructions resident on a nontransitory computer-readable storage medium, the instructions being executable by a processor to (1) receive scoreboard data about a sporting event from a scoreboard, (2) generate a uniform resource locator (URL), the URL comprising a domain name portion and a portion following the domain name portion, the portion following the domain name portion comprising at least a portion of the received scoreboard data, and (3) send the generated URL to the destination as a URL request over a network.

29. The computer program product of claim 1 wherein the received scoreboard data comprises score data for the sporting event.

30. A method for loading score data about a sporting event into a database, the method comprising:
    receiving information about a sporting event, the information comprising score data in an encoded format and an identifier for a scoreboard at a venue where the sporting event is occurring;
    identifying a translation process for the encoded score data based on the scoreboard identifier and sporting event schedule data;
    translating the encoded score data to a decoded format based on the identified translation process; and
    storing the decoded score data in a database; and
    wherein the method steps are performed by a processor.

31. The method of claim 30 further comprising
    the processor maintaining a data structure in a memory, the data structure associating a plurality of translation processes with a plurality of scoreboard identifiers and with sporting event schedule data; and
    wherein the identifying step comprises the processor accessing the data structure based on the scoreboard identifier to determine which of the translation processes is applicable to the encoded score data.

32. The method of claim 31 wherein the data structure comprises a schedule data structure and a translation data structure;
    wherein the schedule data structure comprises a plurality of data items representative of a plurality of different scheduled sporting events, each sporting event data item being associated with a date/time and a scoreboard identifier for the scoreboard at the venue where the sporting event is scheduled to occur;
    wherein the translation data structure comprises a plurality of data items representative of the translation processes, each translation process data item being associated with a sporting event identifier and a scoreboard identifier for the scoreboard at the venue where the sporting event is scheduled to occur; and
    wherein the identifying step comprises the processor (1) identifying the sporting event for the encoded score data by applying the scoreboard identifier in the received information and data representative of a current date and time to the schedule data structure, and (2) identifying the translation process applicable to the encoded score data by applying the identified sporting event and the scoreboard identifier in the received information to the translation data structure.

33. The method of claim 31 wherein the scoreboard comprises a multipurpose scoreboard.

34. The method of claim 31 further comprising performing the method steps for a plurality of different sporting events occurring at a plurality of different venues with a plurality of different scoreboards, wherein the received information for the plurality of different sporting events comprises score data encoded in a plurality of different formats, and wherein the translating step comprises translating the score data encoded in the different formats to a common format using a plurality of identified translation processes.

35. The method of claim 31 wherein the receiving step comprises the processor receiving the information about the sporting event as a uniform resource locator (URL) request from a score source over a network, the URL request comprising a URL, the URL comprising a domain name portion and a portion following the domain name portion, the method further comprising the processor extracting the encoded score data and the scoreboard identifier from the portion of the URL following the domain name portion.

36. The method of claim 35 wherein the portion of the URL following the domain name portion comprises encrypted data, the method further comprising the processor decrypting the encrypted data prior to the extracting step.

37. The method of claim 30 further comprising:
    retrieving score data from the database; and
    providing the retrieved score data to a plurality of score consuming devices for display thereon.

38. The method of claim 37 wherein the sporting event comprises a high school sporting event, the method further comprising:
    selecting an advertisement based on an association between the advertisement and the high school sporting event; and
    providing the selected advertisement to at least one of the score consuming devices for display thereon.

39. A apparatus for loading score data about a sporting event into a database, the apparatus comprising:
    a processor; and
    a memory; and
    wherein the processor and memory are configured to (1) receive information about a sporting event, the information comprising score data in an encoded format and an identifier for a scoreboard at a venue where the sporting event is occurring (2) identify a translation process for the encoded score data based on the scoreboard identifier and sporting event schedule data, (3) translate the encoded score data to a decoded format based on the identified translation process, and (4) store the decoded score data in a database.

40. The apparatus of claim 39 wherein the memory is configured to store a data structure, the data structure configured to associate a plurality of translation processes with a plurality of scoreboard identifiers and with sporting event schedule data, and wherein the processor is further configured to access the data structure based on the scoreboard identifier to determine which of the translation processes is applicable to the encoded score data.

41. The apparatus of claim 40 wherein the data structure comprises a schedule data structure and a translation data structure;
   wherein the schedule data structure comprises a plurality of data items representative of a plurality of different scheduled sporting events, each sporting event data item being associated with a date/time and a scoreboard identifier for the scoreboard at the venue where the sporting event is scheduled to occur;
   wherein the translation data structure comprises a plurality of data items representative of the translation processes, each translation process data item being associated with a sporting event identifier and a scoreboard identifier for the scoreboard at the venue where the sporting event is scheduled to occur; and
   wherein the processor and memory are further configured to (1) identify the sporting event for the encoded score data by applying the scoreboard identifier in the received information and data representative of a current date and time to the schedule data structure, and (2) identify the translation process applicable to the encoded score data by applying the identified sporting event and the scoreboard identifier in the received information to the translation data structure.

42. The apparatus of claim 40 wherein the scoreboard comprises a multipurpose scoreboard.

43. The apparatus of claim 40 wherein the processor and memory are further configured to operate on received information for a plurality of different sporting events occurring at a plurality of different venues with a plurality of different scoreboards, wherein the received information for the plurality of different sporting events comprises score data encoded in a plurality of different formats, and wherein the processor and memory are further configured to translate the score data encoded in the different formats to a common format using a plurality of identified translation processes.

44. The apparatus of claim 40 wherein the processor and memory are further configured to (1) receive the information about the sporting event as a uniform resource locator (URL) request from a score source over a network, the URL request comprising a URL, the URL comprising a domain name portion and a portion following the domain name portion, and (2) extract the encoded score data and the scoreboard identifier from the portion of the URL following the domain name portion.

45. The apparatus of claim 44 wherein the portion of the URL following the domain name portion comprises encrypted data, and wherein the processor and memory are further configured to decrypt the encrypted data prior to the extraction.

46. The apparatus of claim 39 wherein the processor and memory are further configured to (1) retrieve score data from the database, and (2) provide the retrieved score data to a plurality of score consuming devices for display thereon.

47. The apparatus of claim 46 wherein the sporting event comprises a high school sporting event, and wherein the processor and memory are further configured to (1) select an advertisement based on an association between the advertisement and the high school sporting event, and (2) provide the selected advertisement to at least one of the score consuming devices for display thereon.

48. A computer program product for loading score data about a sporting event into a database, the computer program product comprising:
   a plurality of instructions resident on a nontransitory computer-readable storage medium, the instructions being executable by a processor to (1) receive information about a sporting event, the information comprising score data in an encoded format and an identifier for a scoreboard at a venue where the sporting event is occurring (2) identify a translation process for the encoded score data based on the scoreboard identifier and sporting event schedule data, (3) translate the encoded score data to a decoded format based on the identified translation process, and (4) store the decoded score data in a database.

49. The computer program product of claim 48 further comprising:
   a data structure that is readable by a processor and resident on a non-transitory computer readable storage medium, the data structure configured to associate a plurality of translation processes with a plurality of scoreboard identifiers and with sporting event schedule data; and
   wherein the instructions further comprise instructions that are executable by a processor to access the data structure based on the scoreboard identifier to determine which of the translation processes is applicable to the encoded score data.

50. The method of claim 1 wherein the sending step comprises the processor sending the generated URL to the destination via a computer network by emulating a transmission of a URL request from a browser.

51. The apparatus of claim 15 wherein the processor and memory are further configured to send the generated URL to the destination via a computer network via an emulation of a transmission of a URL request from a browser.

52. The computer program product of claim 28 wherein the processor and memory are further configured to send the generated URL to the destination via a computer network via an emulation of a transmission of a URL request from a browser.

* * * * *